United States Patent [19]
Dubois et al.

[11] Patent Number: 5,313,193
[45] Date of Patent: May 17, 1994

[54] OBJECT-MARKING MEANS, METHOD FOR MAKING SUCH MEANS AND READING DEVICE

[75] Inventors: Jean-Clude Dubois, St Remy les Chevreuses; John Magarshack, Rueil Malmaison, both of France

[73] Assignee: Thomson-CSF, Puteaux, France

[21] Appl. No.: 718,983

[22] Filed: Jun. 21, 1991

[30] Foreign Application Priority Data

Jun. 29, 1990 [FR] France .................. 90 08225

[51] Int. Cl.⁵ .................................. G02B 21/00
[52] U.S. Cl. .................... 340/572; 235/454; 235/491; 250/271; 340/600; 382/48
[58] Field of Search .......... 340/572, 600; 382/48; 250/271; 235/436, 491, 494, 456, 454, 487

[56] References Cited

U.S. PATENT DOCUMENTS

| | | | |
|---|---|---|---|
| 3,528,059 | 9/1970 | Spanjersberg | 235/454 |
| 4,180,204 | 12/1979 | Koenig et al. | 235/454 |
| 4,373,159 | 2/1983 | Leavitt et al. | 342/42 |
| 4,656,463 | 4/1987 | Anders et al. | 340/541 |
| 4,910,521 | 3/1990 | Mellon | 375/114 |
| 4,960,984 | 10/1990 | Goldenfield et al. | 235/454 |

FOREIGN PATENT DOCUMENTS

| | | |
|---|---|---|
| 3723856 | 1/1989 | Fed. Rep. of Germany . |
| WO8907302 | 8/1989 | PCT Int'l Appl. . |

*Primary Examiner*—Glen R. Swann, III
*Attorney, Agent, or Firm*—Oblon, Spivak, McClelland, Maier & Neustadt

[57] ABSTRACT

An identification system is disclosed which includes marks on an object for locating a region of the object which contains an identification in the form of either an etching or a responsive electronic circuit and a detection device for detecting the proximity of the first mark in order to localize the position of the etching or responsive electronic circuit so that the etching or responsive electronic circuit may be read.

10 Claims, 5 Drawing Sheets

A. ABSORPTION

FIG.2b

D. BREAKING OF BONDS

FIG.2c

C. ABLATION

OBJECT-MARKING MEANS, METHOD FOR MAKING SUCH MEANS AND READING DEVICE

BACKGROUND OF THE INVENTION

The invention relates to means for marking objects, a method for making these means and devices for the reading of these marks.

This marking is more particularly intended to enable the localizing of marks on valuable objects and the identification of these valuable objects.

Different types of valuable objects may be marked with a view to their identification. These valuable objects are, for example:

art objects such as statues, paintings, ceramics and jewellery;

industrially-manufactured goods such as television sets, video tape-recorders, automobiles, etc.

A marking of this type must have a certain number of characteristics. The marks should be indelible and unfalsifiable. Erasing of a mark should not cause visible deterioration of the object. The marks should be easily readable by a reading means. Preferably, the reading means should be portable and capable of being automated. The marks should be detailed enough to enable identification, difficult for a non-specialist to locate and capable of low cost fabrication.

Some of these qualities are not necessarily compatible with one another. At present, there exist marking systems such as those using fluorescent inks. These systems are difficult to read and can be falsified.

An object of the invention is to enable the marking of an object that combines the necessary qualities: easy reading, unfalsifiability, difficulty of erasure without destruction of the object.

SUMMARY OF THE INVENTION

According to the invention, the object can be marked in two ways: through the marking of a code by laser ablation and through the internal fixing of an electronic circuit or "chip" that can be read from the exterior.

This is why the invention relates to object-marking means comprising an etching of the object and, located in the vicinity of this etching, a marking made of radioactive material.

According to the invention, there is also provision for marking means wherein said means comprise an electronic circuit, an electrical supply circuit, a wave emitter-receiver antenna connected to the electronic circuit as well as a visible mark or a mark made of radioactive material.

According to the invention, the method used to make the marking as well as to make any cavity needed to house the marking comprises etching by a laser that causes an ablation of the material that is to be etched. Ablation occurs when appropriate laser wavelengths and power outputs exist.

Finally, for the reading of the marked device, the invention provides for a reading device that enables the reading of the marking means, wherein said device comprises:

a radioactivity detector;

a detection circuit controlled by the detector and emitting a detection signal;

a emitter-receiver for sending a wave towards the etching and receiving in return, from the etching, said wave bearing a deformation that represents the etching and giving a etching read signal.

The reading device may also be designed to read the marking means provided with an electronic circuit. This reading device then includes an emitter-receiver for sending a supply signal to the antenna as well as an encoded signal and for detecting any information signal given by the antenna, and a processing circuit capable of processing said information signal.

BRIEF DESCRIPTION OF THE DRAWINGS

The different objects and features of the invention shall appear more clearly from the following description, given by way of an example, and from the appended figures, of which.

DETAILED DESCRIPTION OF THE INVENTION

According to the general method of the invention, an object is marked by the etching of an identification code that is almost invisible to the naked eye and the deposition of a mark for the localizing of this etching. This mark is made of a material and is preferably also invisible to the naked eye but it is, in this case, capable of emitting a radiation, for example it is a mark made of radioactive material, or a mark made of fluorescent material which, when excited, will emit an identifiable radiation (for example, it will emit at 0.5 $\mu$m when excited at 1 $\mu$m).

To make the invention clearer in the rest of the description, we shall describe a preferred etching method according to the invention, although such a method is not restrictive.

This etching method according to the invention works by ablation of the material to be etched. This method uses a laser enabling an ablation of the material to be etched, such as an excimer laser, emitting a radiation in the ultraviolet range with a high power density.

For example, depending on the material to be etched, the power density of the laser beam could be between 200 mJ/cm$^2$ (for polymetrical materials) and 40 J/cm$^2$ (for metals).

Figure 1:
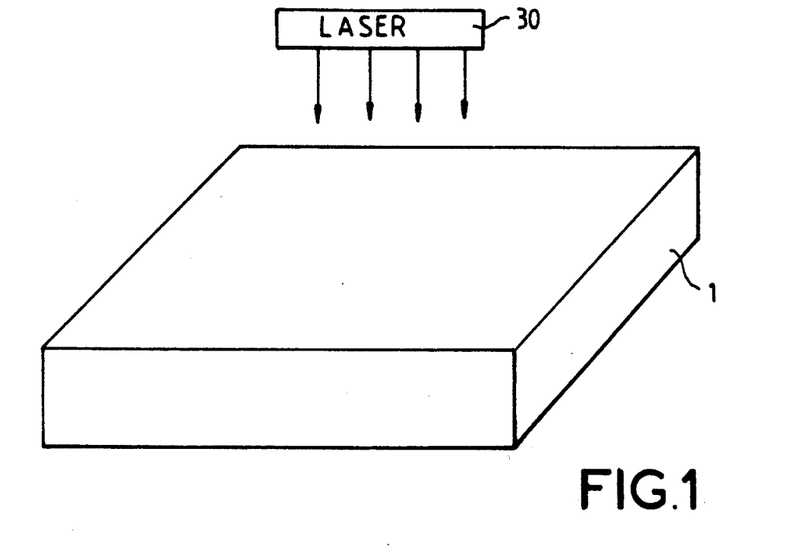
FIG. 1 shows an object to be etched and an etching laser.
Figure 2A:
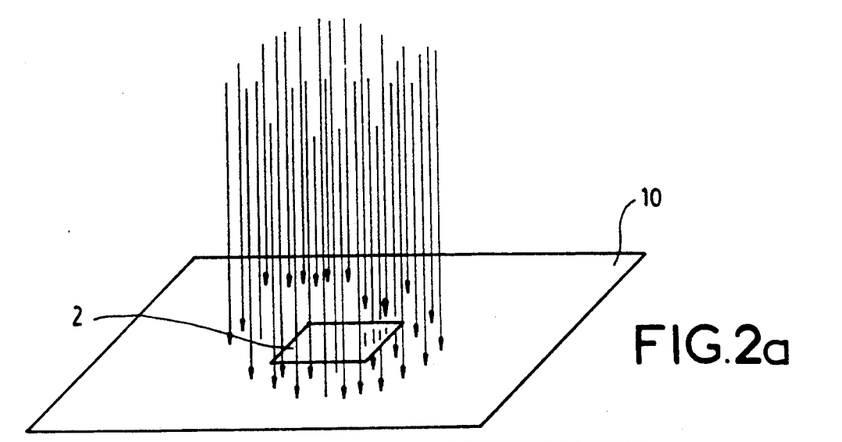
FIGS. 2a to 2d show different etching phases.
Figure 2B:
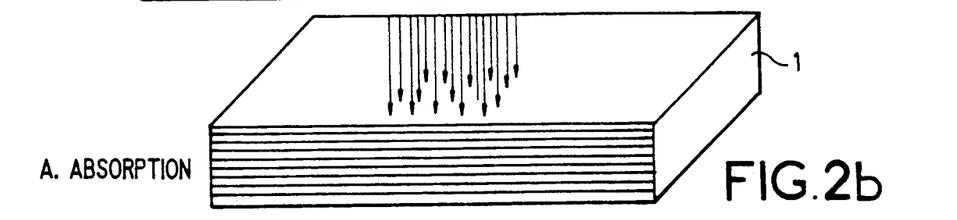
Figure 2C:
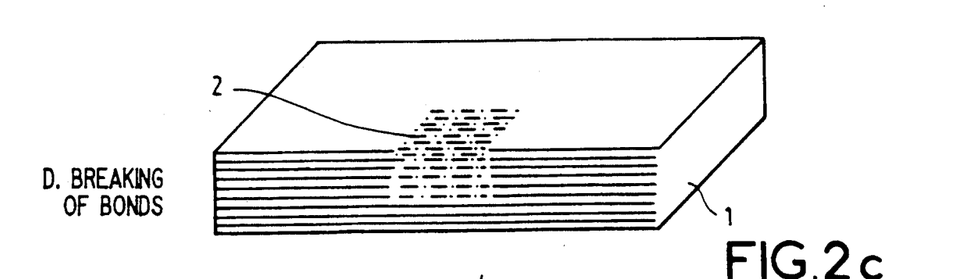
Figure 2D:
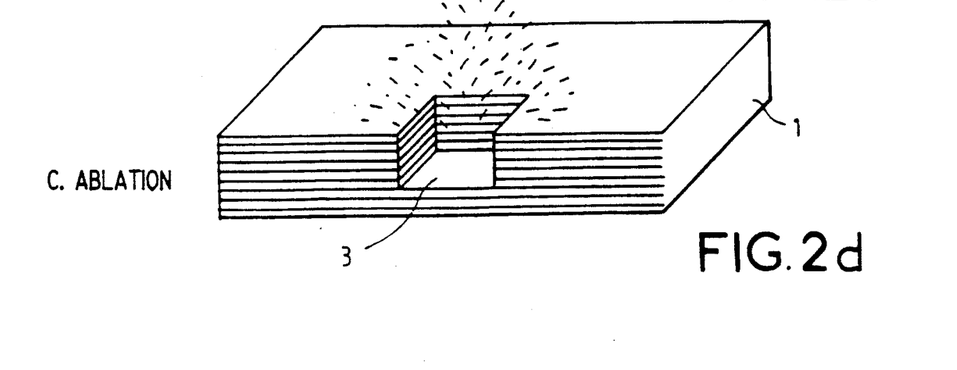

The etching could be a bar code, which could be formed using an etching mask 10 such as the one shown in FIG. 2a. The body 1 to be etched will therefore be subjected to the laser beam (FIG. 2b) and, as shown in FIG. 2c, the body 1 will be etched in the zone 2. Thus an etching 3 as shown in FIG. 2d is obtained.

Excimer lasers emit light with wavelengths of less than one micrometer. Etching by ablation is a non-thermal form of etching that does not alter the properties of the non-ablated portion of the object which may be constituted by materials as different as ceramics, paints and precious or semi-precious stones.

In one variant of the method, the encoding may be visible to the naked eye. In another variant, the encoding cannot be located and the size of the bars of the code is microscopic. The dimensions of the elements of the code may attain some microns. In this case, the code has to be localized by the operator who wishes to read the code. In one variant of the method, a mark enabling the etching to be localized is deposited on the code or beside it. For example, this mark 5 may be made of a material which, in receiving an excitation radiation, emits another radiation. It may be made, for example, of a phosphorescent material which, when excited by a radiation at the wavelength of 1 $\mu$m, emits a wavelength of 0.5 $\mu$m, or of a polymer material containing paradimethyl amino-nitrostilbene or else 3-methyl 4-nitro pyridine N-oxide (POM). It may also be a radioisotope, enabling the code to be localized by the detection of low radioactivity.

Figure 3:
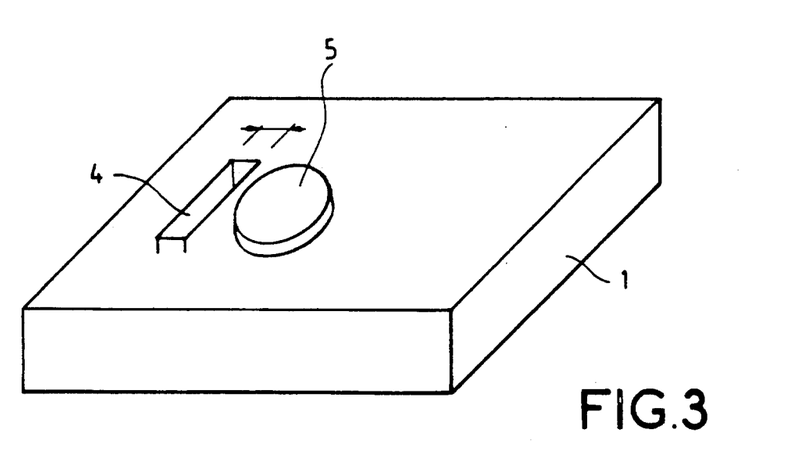
FIG. 3 shows an etched object.

FIG. 3 therefore represents a device according to the invention. It has a microscopic sized etching 4 which may represent a bar code and a mark 5 of a radiating material making it easy to find the microscopic sized etching 4.

Figure 4:
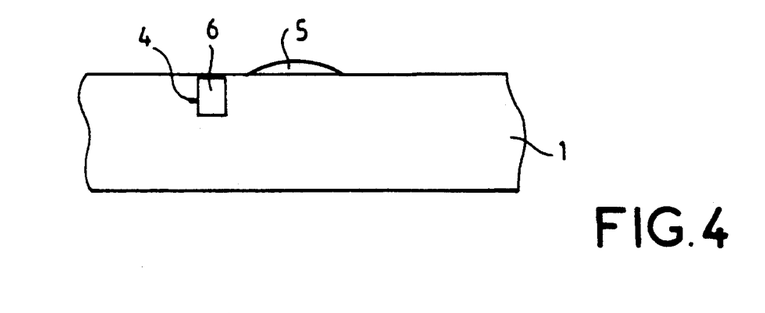
FIG. 4 shows a sectional view of the object of FIG. 3.

According to FIG. 4, the etching 4 is filled with a transparent material 6 which will prevent the etching 4 from getting filled with dust during use and will nevertheless permit optic reading of the etching.

Figure 5:
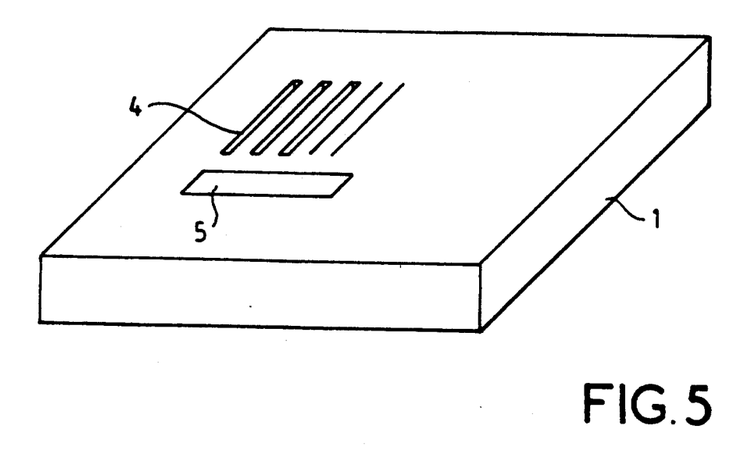
FIG. 5 shows a general view of an object having an etched bar code.

FIG. 5 shows a general view of a marking of an object 1 comprising an etched bar code 4 and a localization marking 5 made of radioactive material.

The object 1 may be the object to be identified itself or else an identification piece that is then bonded to the object to be identified. In the latter case, the identification part is preferably of the same nature and same color as the object so as to merge with it.

Figure 6:
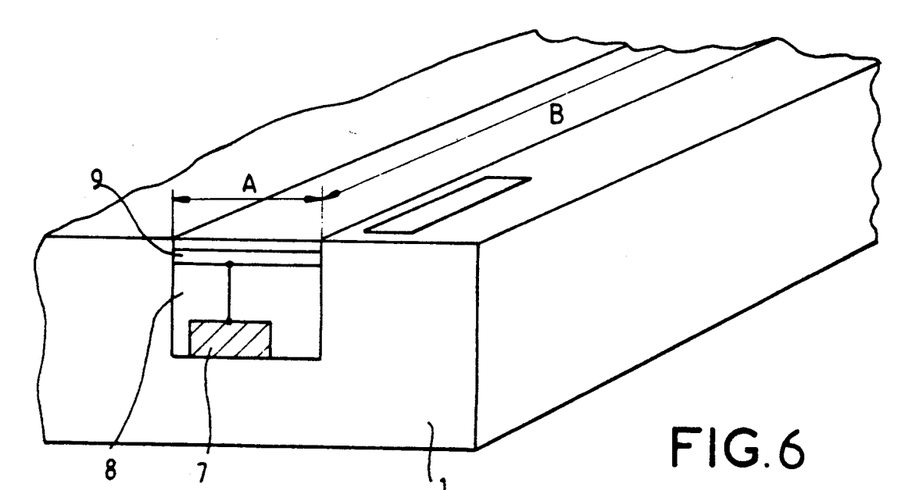
FIG. 6 shows an embodiment of the invention comprising an electronic circuit.

FIG. 6 shows a marking means comprising an electronic circuit 7 in a cavity 8 made as described above. This electronic circuit 7 has an element of identification information in memory. An emission antenna 9 is connected to the electronic circuit 7.

The antenna has dimensions such that they enable the reception of an electromagnetic wave with a determined wavelength. For example, it will have a width A of about 100 micrometers and a length B matched with $\lambda/2$ (for example B=1 cm).

The electronic circuit 7 could include one or more resonant circuits 12 (FIG. 8) in such a way that the circuit 7 sends back only certain frequencies that correspond to the identification code of the object. This identification code is defined by the load impedance constituted by the resonant circuit.

Figure 8:
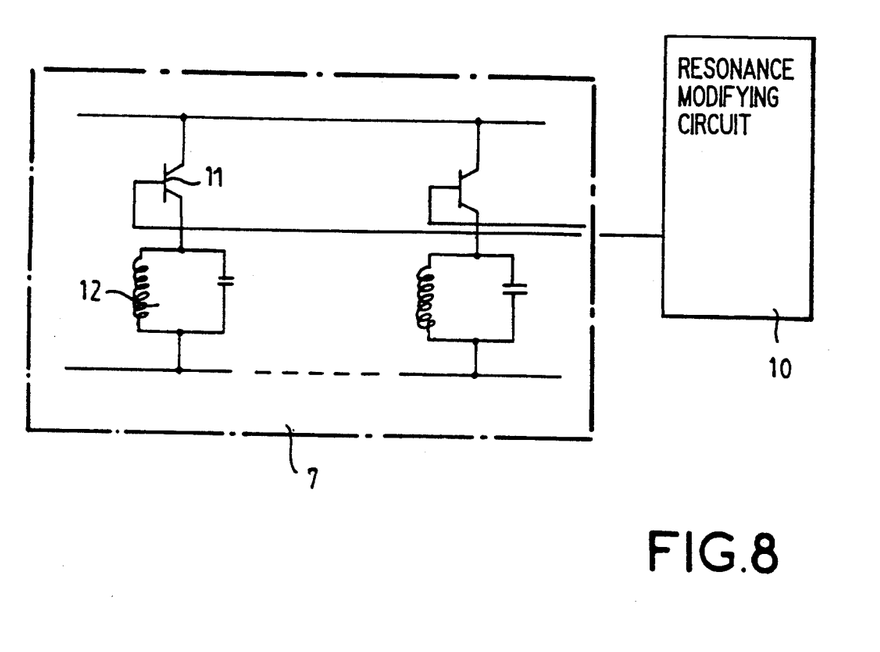
FIGS. 8 and 9 show embodiments of an electronic circuit according to the invention.

To the electronic circuit 7, there may be added another electronic circuit 10 enabling the characteristics of the resonant circuit to be modified. This electronic circuit 10 may be housed in the same hole 8 as the circuit 7. As shown in FIG. 8, switches such as 11, controlled by the electronic circuit 10, are associated with the resonant circuit 7. The electronic circuit 10 may possess its own electrical power supply. This supply may be housed in the hole 8 in which the circuits 7 and 10 are placed. It may also receive its electrical energy from the exterior by means known in the art.

According to FIG. 8 the circuits 7 and 10 are separated, but they may also form a single integrated circuit.

Figure 9:
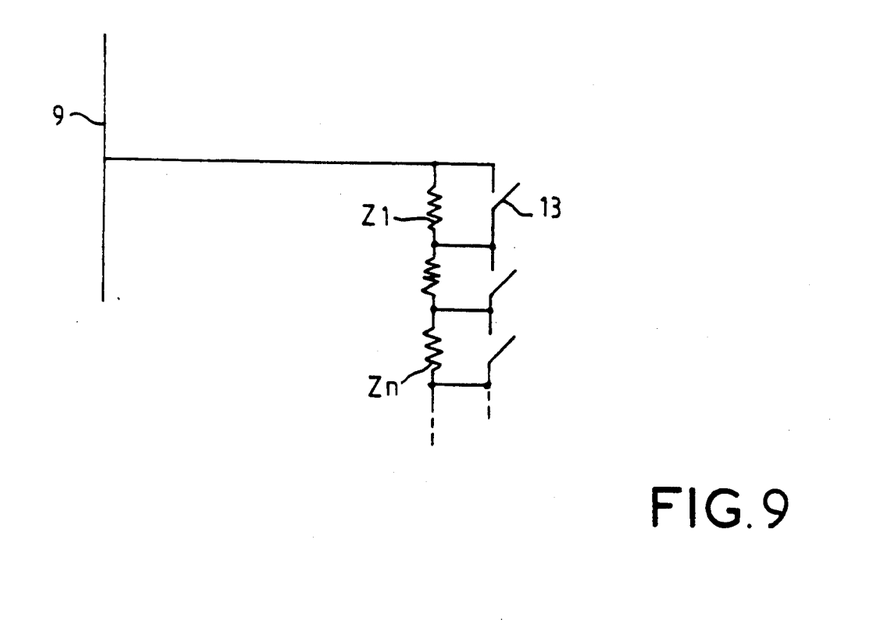

FIG. 9 shows an alternative embodiment of the electronic circuit 7. This circuit has load impedances Z1 to Zn that can be short-circuited selectively under the control of the circuit 10 by switches such as 13.

The set formed by the electronic circuits 7 and the antenna 9 may be buried in a material such as a polymer resin having the same color as this body 1.

The antenna 9 is either buried in the cavity 8 or located on the surface of the body 1.

Furthermore, to localize the antenna 9 of the circuit 7, a mark 5 that is either visible to the naked eye or detectable by any means, such as a mark 5 capable of emitting a radiation, (made of a radioactive material for example) is positioned in the vicinity of the antenna 9.

Figure 7:
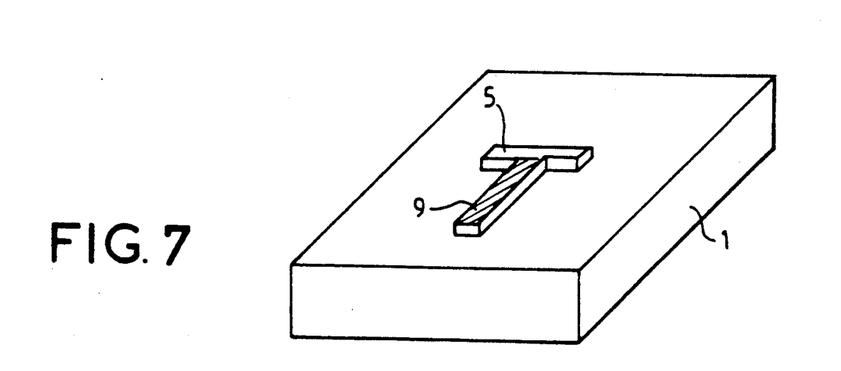
FIG. 7 shows a alternative embodiment of the device of FIG. 6.

According to an alternative embodiment shown in FIG. 7, the mark 5 is not only associated with the antenna 9 but the antenna 9 is itself integrated with the mark 5 and is merged with it. The circuit 7, which cannot be seen in FIG. 7, is then preferably located beneath the mark 5.

In FIG. 6, there is no provision for a supply circuit of the electronic circuit 7. According to another variant, a supply circuit may be provided for.

According to one alternative embodiment of the invention, the electronic circuit 7 is capable of receiving a user code (secret code) through the antenna 9, of identifying this code and, if this code is identified, of emitting the object identification code that it possesses in memory through the antenna 9.

For example, the device of FIG. 6 is made as follows:

A hole with a diameter of the order of one millimeter is made in the object, for example by an etching method as described here above. This hole may therefore be made, for example, by laser ablation. The circuits or "chips" are then placed in the hole and an etching of appropriate dimensions (100 $\mu$m $\times$ 1 cm according to the above example) is designed to house the antenna 9. It is also possible not to bury the antenna but to bond it to the object.

The working frequencies of the circuit are preferably in millimetric waves. For example, an appropriate frequency may be 94 GHz. At this frequency, the diameter of the antenna is of the order of 1.5 mm. The assembly formed by the electronic circuits and the antenna 9 may then be placed in the hole 8 and then covered with a sealing resin, for example an epoxy resin that may make it invisible.

In another version, only the chip may be embedded and a metal part of the object may be used as an antenna (for example the annular band part of a jewel ring, the frame of a picture, the casing of an instrument or the trunk of an automobile).

The circuit may be encoded and read from the exterior.

According to one alternative embodiment, on the object 1, there is made a combination of an electronic circuit 7, placed on or in the object 1 but not visible, and a visible code, such as a bar code, made on the sealing resin of the electronic circuit 7 or on any other part of the object 1, according to a previous method for example.

The bar code enables easy identification of the object 1, and may be read by anyone, while the identification information, contained in the electronic circuit 7, is accessible only to a user who has a reading apparatus adapted to the electronic circuit and knows the appropriate code that enables him to read the contents of the recorded information in the electronic circuit 7.

The invention also relates to devices for reading the marking means described here above.

Figure 10:
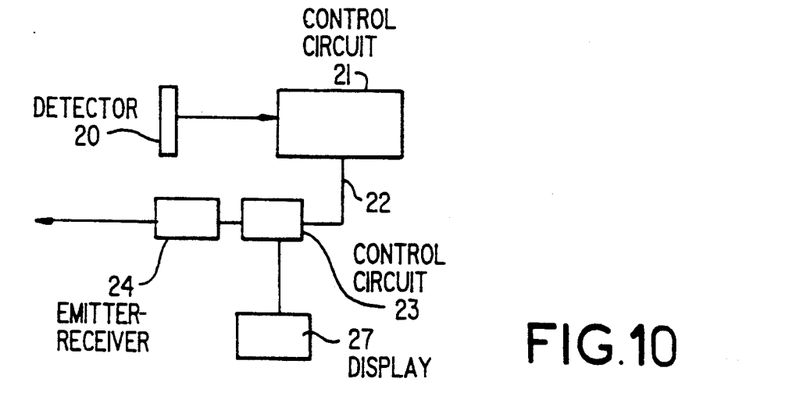
FIG. 10 shows a device for the reading of the marking means of FIG. 3.

FIG. 10 shows, for example, means for reading the marking means of FIG. 3.

A detector 20 enables the mark 5 to be detected. It is, for example, a radioactivity detector if the mark 5 is made of radioactive material. When the detector 20 detects the mark 5, it controls the circuit 21. This circuit 21 emits a signal 22. The signal 22 controls the control circuit 23 and an emitter-receiver 24 emits a light radiation that scans the surface of the object 1 on which the mark 5 is located. The light radiation is reflected by the object 1 towards the emitter-receiver 24.

The reflected radiation is disturbed (in phase) or in intensity by the etching that it encounters at the surface of the object 1. The detector, in a manner known in the art, detects these disturbances and therefore detects the code etched on the object. A display device 27 displays the detected information.

Figure 11:
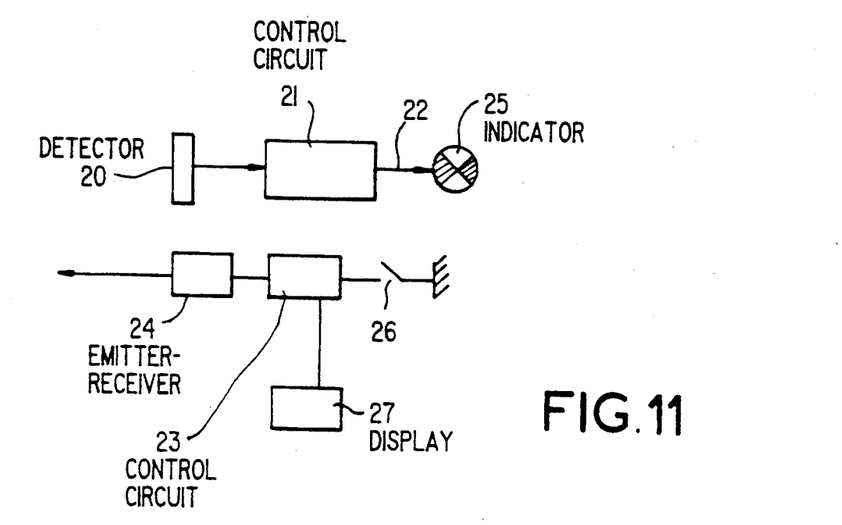
FIG. 11 shows an alternative embodiment of the device of FIG. 8.

According to an alternative embodiment shown in FIG. 11, the signal 22 emitted by the circuit 21 is transmitted to an indicator light or sonorous indicator device 25. An operator then uses a switch 26 to control the working of the control circuit CC and of the emitter-receiver DL.

For the reading of a marking device with electronic circuit, of the type shown in FIG. 6, a device of FIG. 10 will have a structure similar to that of the above-described reading devices.

If it is assumed that a mark visible to the operator enables the easy identification of the localization of the antenna 9, then the device of FIG. 10 does not need a detector 20 or circuit 21.

Figure 12:
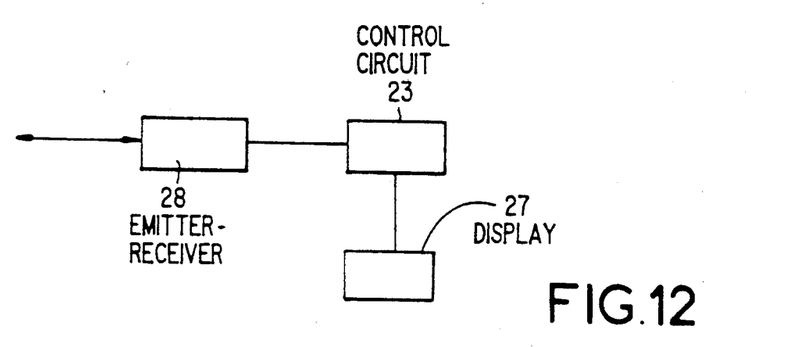
FIG. 12 shows a device for reading the marking means of FIG. 6.

According to a preferred embodiment, the device of FIG. 6 has no supply circuit. The circuit 28, as shown in FIG. 12 is therefore capable, under the command 23, of emitting a radiation. The antenna 9, depending on its load, sends back certain frequencies that correspond to the identification code of the object characterized by the structure of the electronic circuit 7. The circuit 28 receives this information relating to frequencies and transmits it to the circuit 23 which processes it and displays it on the display device 27.

It is quite clear that the above description has been given purely by way of example. The numerical values, in particular, have been given only in order to illustrate the description.

What is claimed is:

1. An identification system for identifying an object to which it is attached, comprising:
    an etching on a surface of the object; and
    a marking means for locating the etching, said marking means being attached to the object and disposed near the etching;
    an electronic circuit for storing an identification data associated with said object; and
    a wave emitter-receiver antenna connected to said electronic circuit.

2. An identification system according to claim 1, wherein:
    said object defines a cavity in which the electronic circuit is disposed; and
    said emitter-receiver antannae is situated at one of adjacent to the electronic circuit and on the surface of the object.

3. An identification system according to claim 1, wherein the marking means comprises the emitter-receiver antenna.

4. A method for forming an identification system on an object to be identified, comprising the steps of:
    etching a visible identification on a surface of the object;
    forming a marking means for locating the etching, comprising one of a visible mark which may be located by visible inspection and a radiation emitting source;
    disposing said marking means close to said etching; and
    inserting an electronic identification circuit, to which a radiation emitter antenna is attached, into said etching.

5. A method for forming an identification system on an object to be identified, comprising the steps of:
    etching a visible identification on a surface of the object;
    forming a marking means for locating the etching, comprising one of a visible mark which may be located by visual inspection and a radiation emitting source;
    disposing said marking means close to said etching; and
    wherein the step of etching comprises ablating material to be etched with a laser pulse.

6. A reading device for identifying an object by reading an identification from an identification system connected to said object, comprising:
    a means for detecting the proximity of a radioactivity source, comprising a radioactivity intensity detector and a detection circuit coupled to said radioactivity detector which emits a detection signal that is responsive to the intensity of detected radioactivity; and
    means for reading information from an etching on the surface of the object, comprising an emitter-receiver for sending a wave toward the etching and for receiving from the etching, a wave corresponding to information associated with the etching, wherein the means for detecting allows location of the reading device close enough to the object for the means for reading to read the etching.

7. A device according to claim 6, further comprising:
    a signal means, coupled to said detection circuit, for providing an audio or visual signal.

8. A device for reading a microscopic identification from an identification system of an object, comprising:
    a radioactivity detector for detecting radiation emitted by a radioactive mark;
    a control circuit coupled to the radioactivity detector for detecting a level of radiation detected by the radioactivity detector and for emitting a control signal when said level of radiation is above a predetermined level;
    a second control circuit, coupled to the first control circuit, and coupled to an optical emitter-receiver, for controlling the optical emitter-receiver to emit a light radiation towards a source of radioactivity;
    said optical emitter-receiver for generating and emitting said radiation and for receiving reflected light radiation which is reflected from the vicinity of the radioactivity source.

9. An identification system for identifying an object to which it is attached, comprising:

an etching on a surface of the object, wherein said etching is optically scannable;

marking means for locating the etching, said marking means being attached to the object and disposed near the etching; and, wherein the etching is filled with a transparent resin.

10. A method for forming an identification system on an object to be identified, comprising the steps of:

etching a visible identification on a surface of the object, wherein the surface is optically scannable;

forming a marking means for locating the etching, comprising a radiation emitting source;

disposing said marking means close to said etching; and forming a cavity in the object by ablating material with a laser pulse and disposing said radiation emitting source in said cavity.

* * * * *

UNITED STATES PATENT AND TRADEMARK OFFICE
CERTIFICATE OF CORRECTION

PATENT NO. : 5,313,193
DATED : May 17, 1994
INVENTOR(S) : Jean-Claude Dubois et al.

It is certified that error appears in the above-indentified patent and that said Letters Patent is hereby corrected as shown below:

On the title page, Item [75],

The first inventor's first name should read:

--Jean-Claude--

Signed and Sealed this

Sixteenth Day of August, 1994

Attest:

BRUCE LEHMAN

*Attesting Officer*  *Commissioner of Patents and Trademarks*